C. MOLL.
ROW MARKER FOR CORN PLANTERS.
APPLICATION FILED AUG. 2, 1915.
1,169,275.
Patented Jan. 25, 1916.
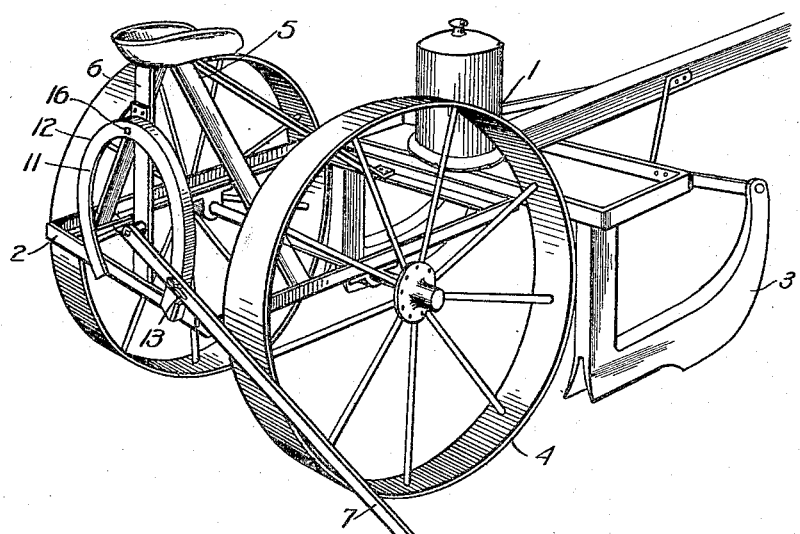
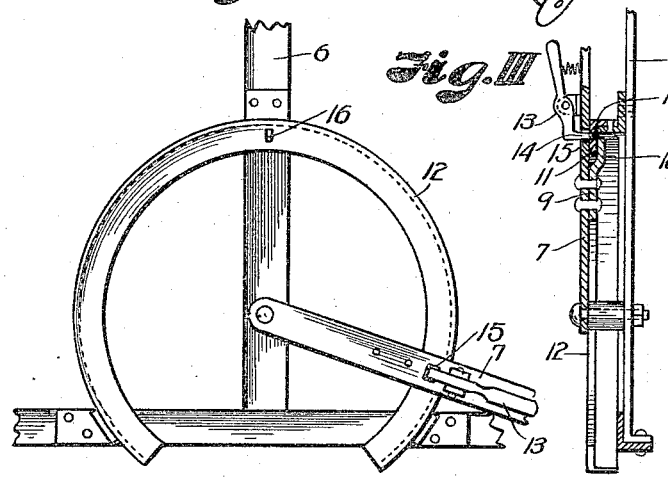
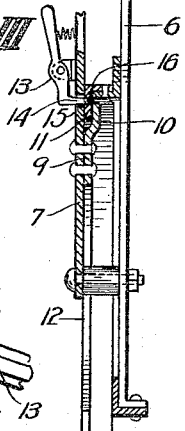
INVENTOR
Clinton Moll
BY
Arthur C. Brown
ATTORNEY

UNITED STATES PATENT OFFICE.

CLINTON MOLL, OF OLATHE, KANSAS.

ROW-MARKER FOR CORN-PLANTERS.

1,169,275.  Specification of Letters Patent.  Patented Jan. 25, 1916.

Application filed August 2, 1915. Serial No. 43,125.

*To all whom it may concern:*

Be it known that I, CLINTON MOLL, a citizen of the United States, residing at Olathe, in the county of Johnson and State of Kansas, have invented certain new and useful Improvements in Row-Markers for Corn-Planters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to corn planters, and more particularly to a corn row marker; the principal object of the invention being to provide a substantial row marker which may be swung to either side by the driver, without the necessity of dismounting from the planter.

A further object of the invention is to provide a marker which is held substantially rigid without the usual braces or tie rods.

In accomplishing these and other objects of the invention I have provided improved details of structure, the preferred forms of which are illustrated in the accompanying drawings, wherein:—

Figure I is a perspective view of a planter equipped with a row marking device constructed according to my invention. Fig. II is a rear elevation of the arm mounting. Fig. III is a vertical section of the same.

Referring more in detail to the parts: 1 designates a corn planter of ordinary construction having a frame 2, planting runners 3, ground wheels 4 and a seat frame 5. The planter frame 2 is extended slightly back of the wheel line and secured thereto at the center is a vertical brace 6 which serves as a seat supporting member and also is utilized in the mounting of parts presently described.

It is known that in order to properly cultivate growing corn, and so that the plant will not be injured by the cultivator shovels, it is necessary that the corn rows should be parallel and equally spaced, and to insure a proper spacing of the corn rows I have provided a marking arm 7 having, at its outer end, a revoluble disk 8, which is adapted to contact the ground surface to leave a mark to guide the driver on a return trip across the field. The arm 7 is pivotally mounted at its inner end on the brace 6 and is extended at a right angle with the course of the planter, and is of such length that when the driver makes a return trip, by following the mark previously made, by the disk 8 thereon, proper spacing of the rows is insured.

In order to hold the arm 7 securely in its lateral position and so that at the same time it may be free to be swung vertically from one side of the planter to the opposite side, I provide the same with a retaining lug 9, which is riveted thereto and has a lip 10 spaced sufficiently from the arm to receive the flange 10 of a circular segment 12; the segment being angular in cross section and secured rigidly to the frame concentric with the arm pivot. As a means of holding the arm in neutral position I provide a spring-pressed latch 13, which is secured to the arm 7 and has a tooth 14 which projects through an aperture 15 in the arm and is adapted for registering in a slot 16 in the flange 11 of the segment 12 whereby the arm is retained in a vertical position.

In using the device, presuming the parts to be constructed as described, as the driver starts on a trip across the field, the arm is dropped so that the disk will have rolling contact with the ground and cut a mark thereon. When the end of the row is reached, the driver swings the arm vertically to the opposite side of the planter and starts on a return trip following the mark previously made.

It will be seen that by so constructing the device, it is unnecessary for the driver to dismount from the planter to reverse the marker, which is accessible from the planter seat and is held securely in an outward position and at the same time has free vertical movement.

Having thus described my invention, what I claim as new therein and desire to secure by Letters-Patent, is:

1. The combination with a frame, of an arc-shaped guide arranged vertically on the frame and provided with apertures, an arm pivoted on the frame concentrically with the guide and bearing thereagainst, a marker on the outer end of said arm, a keeper on said arm lying along the side of the guide opposite the arm, and a latch on said arm having a tooth adapted for projection into the guide apertures.

2. The combination with a frame, of an arc-shaped guide comprising a body L- shaped in cross section with one member secured to the frame and the other member forming a flat bearing face having its free edge at the interior of the arc, an arm pivoted to the frame concentrically with the guide, a marker at the free end of the arm, and a keeper attached to the arm and having a lip lying at the side of the flat face member of the guide opposite the arm, to hold the arm to the guide while permitting free pivotal movement of the arm.

In testimony whereof I affix my signature.

CLINTON MOLL.

Copies of this patent may be obtained for five cents each, by addressing the "Commissioner of Patents, Washington, D. C."